United States Patent [19]

Kozmiski

[11] Patent Number: 5,216,046

[45] Date of Patent: Jun. 1, 1993

[54] POLYMER BLEND COMPOSITIONS

[75] Inventor: Stanley J. Kozmiski, New England, W. Va.

[73] Assignee: General Electric Company, N.Y.

[21] Appl. No.: 841,211

[22] Filed: Feb. 27, 1992

Related U.S. Application Data

[63] Continuation of Ser. No. 734,078, Jul. 22, 1990, abandoned, which is a continuation of Ser. No. 584,391, Sep. 18, 1990, abandoned, which is a continuation of Ser. No. 374,018, Jun. 30, 1989, abandoned.

[51] Int. Cl.5 ................... C08K 3/20; C08L 55/02
[52] U.S. Cl. ................... 523/407; 524/501; 524/504; 524/910; 525/65; 525/942
[58] Field of Search ............ 523/407; 524/501, 504, 524/910; 525/65, 942

[56] References Cited

U.S. PATENT DOCUMENTS

| | | | |
|---|---|---|---|
| 3,425,981 | 2/1969 | Puletti et al. | 524/586 |
| 3,450,794 | 6/1969 | Ebneth et al. | 525/86 |
| 4,315,081 | 2/1982 | Kobayashi et al. | 525/2 |
| 4,357,270 | 11/1982 | Pippa et al. | 523/335 |
| 4,543,390 | 9/1985 | Tanaka et al. | 525/63 |
| 4,588,773 | 5/1986 | Federl et al. | 525/64 |
| 4,719,263 | 1/1988 | Barnhouse et al. | 525/187 |
| 4,775,716 | 10/1988 | Kipouras et al. | 525/64 |

Primary Examiner—Paul R. Michl
Assistant Examiner—Guarriello, John J.
Attorney, Agent, or Firm—Lowe, Price, LeBlanc & Becker

[57] ABSTRACT

Antistatic polymer blend compositions comprise an ABS graft copolymer, a copolymer of an epihalohydrin and a copolymerizable monomer having an oxirane group, and a surfactant.

10 Claims, No Drawings

POLYMER BLEND COMPOSITIONS

This application is a continuation of application Ser. No. 07/734,078 now abandoned filed Jul. 22, 1990, which is a continuation of prior application Ser. No. 07/584,391, now abandoned, filed on Sep. 18, 1990, which is a continuation of prior application Ser. No. 07/374,018, now abandoned, filed on Jun. 30, 1989.

FIELD OF THE INVENTION

Polymers having electrostatic dissipative properties.

BACKGROUND OF THE INVENTION

This invention is an improvement on the inventions described and claimed in U.S. Pat. Nos. 4,588,773 (Federl et al I) and 4,775,716 (Kipouras et al or Federl et al II) and U.S. Pat. No. 4,857,590 (Gaggar et al), all of which are assigned to the predecessor of the present application's assignee.

Federl et al I relates to the use of an ABS graft copolymer containing an antistatic agent consisting essentially of a copolymer of epichlorohydrin and an oxirane composition, ethylene oxide. Federl et al II, a continuation-in-part of Federl et al I, also concerns an antistatic graft ABS, but one which contains smaller amounts of an epichlorophyorin/oxirane copolymer having a somewhat higher ratio of ethylene oxide to epichlorohydrin in said copolymer. U.S. Pat. No. 4,857,590 (Gaggar et al) is directed to the use of an alkyl methacrylate polymer to compatibilize the antistatic composition with the ABS polymer.

U.S. Pat. No. 4,719,263 (Barnhouse et al), discloses that the antistatic properties of various polymers may be improved by adding a copolymer of epichlorohydrin and ethylene oxide.

In U.S. Pat. No. 4,315,081 (Kobayashi et al) there is described a graft polymer containing an anionic surfactant to render the base resin antistatic. This patent is directed to specific graft polymers in which the rubbery backbone or trunk is a copolymer of a conjugated diene and a polyalkylene oxide monomer, although conventional ABS examples are given as controls. These polymers are purportedly rendered antistatic by the incorporation of up to about 5 wt.% of an anionic surfactant. A feature distinguishing Kobayashi from the present invention is that in the former, the surfactant is the only ingredient added for the promotion of antistatic properties. Moreover, since the test method described in the specification is not widely recognized, it is not possible to determine the absolute value of the antistatic properties attainable.

In the Gaggar et al patent, it was pointed out that certain properties such as tensile strength, heat distortion temperature and modulus are adversely affected by the introduction of the epichlorohydrin/ethylene oxide copolymer. Even the lower levels of loading described in the Federl et al II patent result in poorer physical properties. The use of an alkyl methacrylate polymer, such as poly (methyl methacrylate) promotes the compatibility between the base polymer and the copolymer.

SUMMARY OF THE INVENTION

The present invention is directed to the use of certain surfactants to synergistically improve the antistatic properties of ABS polymers using epichlorohydrin and ethylene oxide copolymer as an antistatic agent. While there are references to the use of such copolymers in ABS, for example in the various references mentioned above, there are no teachings of the enhancement of the antistatic properties with a synergist, such as the anionic, cationic and nonionic surfactants used in the present invention.

DETAILED DESCRIPTION:

The need for thermoplastic molding compositions which rapidly dissipate a static charge has grown substantially in recent years. It is reliably estimated that static electricity costs industry millions of dollars in expensive repair and replacement of sensitive electronic components alone. Major applications for such material include tote boxes for the storage of computer chips and other electronic components, xerographic copier parts and communications equipment. Static electricity is also a major hazard where explosive materials are present.

Static electricity is very expensive to control in polymeric materials. Until the invention of Federl I, thermoplastics were generally rendered at least partially antistatic by the incorporation of conductive materials into the resin, such as carbon black particles, or carbon (or metallic) fibers. The literature is replete with attempts to render polymers antistatic all of which have met with less than successful results.

ABS is one of the most commercially important thermoplastics manufactured in significant quantities. Its major uses include automotive components, electronic/computer applications, appliances and construction. Its versatility makes it one of the most important engineering resins manufactured worldwide.

ABS polymers are styrenic resins containing two or more polymeric parts of different compositions that are bonded chemically. The polymer is preferably prepared by polymerizing a conjugated diene, such as butadiene or a conjugated diene with a monomer copolymerizable therewith, such as styrene, to provide a polymeric backbone. After formation of the backbone, at least one grafting monomer, and preferably two, are polymerized in the presence of the prepolymerized backbone to obtain the graft polymer. These resins are prepared by methods well known in the art.

The backbone polymer, as mentioned, is preferably a conjugated diene polymer such as polybutadiene, polyisoprene, or a copolymer, such as butadiene-styrene, butadieneacrylonitrile, or the like.

The specific conjugated diene monomers normally utilized in preparing the backbone of the graft polymer are generically described by the following formula:

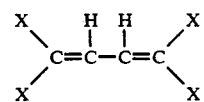

wherein X is selected from the group consisting of hydrogen, alkyl groups containing from one to five carbon atoms, chlorine or bromine. Examples of dienes that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, chloro and bromo substituted butadienes such as dichlorobutadiene, bromobutadiene, dibromobutadiene, mixtures thereof, and the like. A preferred conjugated diene is butadiene.

One monomer or group of monomers that may be polymerized in the presence of the prepolymerized backbone are monovinylaromatic hydrocarbons.

The monovinylaromatic monomers utilized are generically described by the following formula:

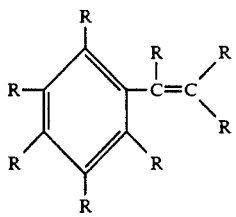

wherein each R is selected from the group consisting of hydrogen, alkyl, halogen, cycloalkyl, aryl, alkaryl, aralkyl, alkoxy and aryloxy groups. Examples of the monovinylaromatic compounds and alkyl-, cycloalkyl-, aryl-, alkaryl-, aralkyl-, alkoxy-, aryloxy-, and other substituted vinylaromatic compounds include styrene, 4-methylstyrene; 3,5-diethylstyrene, 4-n-propylstyrene, a-methylstyrene, a-methyl vinyltoluene, a-chlorostyrene, a-bromostyrene, dichlorostyrene, dibromostyrene, tetra-chlorostyrene, mixtures thereof, and the like. The preferred monovinylaromatic hydrocarbons used are styrene and/or a-methylstyrene.

A second group of monomers that may be polymerized in the presence of the prepolymerized backbone are acrylic monomers such as acrylonitrile, substituted acrylonitrile, and/or acrylic acid esters, exemplified by acrylonitrile, and alkyl acrylates such as methyl methacrylate.

The acrylonitrile, subsituted acrylonitrile, or acrylic acid esters are described generically by the following formula:

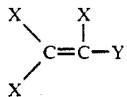

wherein X is as previously defined and Y is selected from the group consisting of cyano and carbalkoxy wherein the alkoxy group of the carbalkoxy contains from one to about twelve carbon atoms. Examples of such monomers include acrylonitrile, ethacrylonitrile, methacrylonitrile, a-chloroarylonitrile, b-chloroacrylonitrile, a-bromoacrylonitrile, and b-bromoacrylonitrile, methyl acrylate, methyl methacrylate, ethyl acrylate, butyl acrylate, propylacrylate, isopropyl acrylate and mixtures thereof. The preferred acrylic monomer is acrylonitrile and the preferred acrylic acid esters are ethyl acrylate and methyl methacrylate.

In the preparation of the graft polymer, the conjugated diene polymer or copolymer exemplified by a 1,3-butadiene polymer or copolymer comprises about 10 to about 75% by weight of the total graft polymer composition. The monomers polymerized in the presence of the backbone, exemplified by styrene and acrylonitrile, comprise from about 25 to about 90% by weight of the total graft polymer composition.

The monovinylaromatic hydrocarbon exemplified by styrene comprises from about 30 to about 70% by weight of the total graft polymer composition. The second group of grafting monomers, exemplified by acrylonitrile, ethyl acrylate or methyl methacrylate, of the graft polymer composition, preferably comprise from about 10% to about 40% by weight of the total graft copolymer composition. In preparing the polymer, it is normal to have a certain percentage of the polymerizing monomers that are grafted on the backbone combine with each other and occur as free copolymer. If styrene and acrylonitrile are utilized as the grafting monomers, a certain portion of the composition will copolymerize as free styrene-acrylonitrile copolymer. In the case where a-methylstyrene (or other monomer) is substituted for the styrene in the composition used in preparing the graft polymer, a certain percentage of the composition may be an a-methylstyrene-acrylonitrile copolymer. Also, there are occasions where a copolymer, such as a-methylstyreneacrylonitrile, is added to the graft polymer copolymer blend. When a graft polymer-copolymer blend is referred to herein, it is meant optionally to include at least one copolymer blended with the graft polymer composition and which may contain up to 90% of free copolymer.

Optionally, the elastomeric backbone may be an acrylate rubber, such as one based on n-butyl acrylate, ethylacrylate, 2-ethylhexylacrylate, and the like. Additionally, minor amounts of a diene may be copolymerized in the acrylate rubber backbone to yield improved grafting with the matrix polymer.

These resins are well known in the art and many are commercially available.

The antistatic agent, which constitutes about 5 to about 20 wt% of the blend, is a copolymer of an epihalohydrin, preferably epichlorohydrin, and an alkylene oxide, preferably ethylene oxide. Epihalohydrin monomers have the formula:

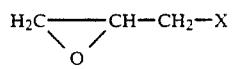

wherein X is chlorine, bromine or iodine. Preferably X is chlorine, i.e. epichlorohydrin.

The epihalohydrin may be copolymerized with any of a variety of other known, copolymerizable monomers which have an oxirane group. Such monomers include glycidyl ethers, monoepoxides of dienes and polyenes, glycidyl esters and alkylene oxides. Examples of such monomers include vinyl glycidyl ether, isopropenyl glycidyl ether, butadiene monoxide, chloroprene monoxide, 3,4-epoxy-1-pentene, glycidyl acrylate, glycidyl methacrylate, 1,2-epoxy-3,3,3,trichloropropane, phenyl glycidyl ether, ethylene oxide, propylene oxide and trichlorobutylene oxide.

Preferably the monomer is an alkylene oxide such as ethylene oxide, propylene oxide, butylene oxide, 3,4-epoxy-1-pentene, 1,2-epoxy-3,3,3-trichloropropane, trichlorobutylene oxide and the like. Ethylene oxide is most preferred.

In the preferred embodiment, epichlorohydrin and ethylene oxide are copolymerized to form an epichlorohydrin rubber. Materials of this type are made commercially under the trademark HYDRIN (B. F. Goodrich).

The discovery that anionic surfactants promote the antistatic activity of the epichlorohydrin/ethylene oxide copolymers is of considerable importance. First of all, the antistatic agent is relatively expensive, being available only at a cost of 5-6 times the cost of the base ABS resins. Also, most antistatic agents of the type preferred for use in the present invention have a tendency to degrade certain physical properties of the ABS. Still another problem encountered is that some reaction takes place between the antistatic agent and the ABS which produces an undesirable odor. It follows then that reducing the amount of antistatic composition that has to be blended into the ABS results in lower manufacturing costs and better overall quality without sacrificing the physical properties of the resin. The synergistic surfactants of the present invention are effective in enhancing the electrostatic dissipative properties so that relatively smaller quantities of the electrostatic agent need be incorporated into the ABS.

Surfactants generally are wetting agents having a molecule with a hydrophylic portion and a hydrophobic portion. Surfactants have long been used by themselves in polymers to render them non-dusting and have been recognized as capable of reducing the degree of static buildup on plastic parts, such as audio/video tape cartridges and similar application. It should be noted that anti-dust is not by any means to be considered as being equivalent to antistatic. Compositions using surfactants alone simply do not measure up to the stringent requirements of Federal Test Method 101B, method 4046.

Anionic surfactants are preferred but cationic and nonionic surfactants also are effective. Also, suitable for use in this invention are cationic surfactants, for example quaternary ammonium compounds, provided with an anionic surfactant substituent for improving their thermal stability. Such surfactants may be referred to as cationic/anionic surfactants. The largest class of anionic surfactants comprises alkylaryl sulfonates and derivatives thereof, such as sodium dodecylbenzene sulfonate (SDBS) and aryl sulfonates such as potassium diphenylsulfone sulfonate (KSS). Examples of cationic and nonionic surfactants are, respectively, modified onium salts and polyethylene oxides.

Preferably, the surfactant is included in the compositions of the invention in an amount in the range of about 0.1 to about 5 weight percent, and, more preferably, in the range of about 0.5 to about 3 weight percent.

The invention can best be understood by referring to certain specific examples of the compositions generally described above.

EXAMPLES 1-7

In these and the following examples, blends were prepared using a Banbury mixing apparatus at a drop temperature of 370° F. Testing for electrostatic discharge properties was performed on injection molded discs using Federal Test Method 101B, Method 4046, the specifications of which are incorporated herein by reference. The blend recipes and electrostatic dissipation (ESD) performance of the blends are summarized in Table I below.

The ABS component employed in Examples 1-7 was a high rubber graft (HRG) comprising approximately 50 weight percent rubber, 35 weight percent styrene and 15 weight percent acrylonitrile. The compositions also included a styreneacrylonitrile copolymer component (SAN) containing approximately 72 weight percent styrene and 28 weight percent acrylonitrile, and magnesium stearate (MgSt). The antistatic agent (ECHEO) employed was an epichlorohydrin-ethylene oxide copolymer, while the surfactant employed was selected from sodium dodecylbenzene sulfonate (SDBS) and potassium diphenylsulfone sulfonate (KSS). The compositions also included polymethylmethacrylate (Rohm & Haas V920).

The data in Table I clearly indicates a dramatic improvement in the ESD properties using anionic surfactants as a synergist. While SDBS and KSS were used in the examples, related compositions may be used with confidence that improved performance will be obtained.

EXAMPLES 8-14

Additional examples were prepared and tested to determine the effect, if any, that the inclusion of such anionic surfactants have on other styrenic polymers by themselves, and, combined with a compatibilizing agent such as polymethylmethacrylate (PMMA), has on ESD performance and a key physical property, such as Izod impact strength. The recipes of Examples 8-14 were prepared in the same manner described in connection with Examples 1-7 and then were compression molded into test bars. Test bars were tested for the ESD and Izod impact strength, the results of which are set forth in Table II below.

TABLE II

| Ex. No. | 8 | 9 | 10 | 11 | 12 | 13 | 14 |
|---|---|---|---|---|---|---|---|
| Mobil HIPS 4154 | 90 | 90 | 90 | 90 | 90 | 86 | 82 |
| ECHEO | 10 | 10 | 10 | 10 | 10 | 10 | 10 |
| PMMA | | | | | | 4 | 8 |
| EBS Wax | 1 | 1 | 1 | 1 | 1 | 1 | 1 |
| MgSt | 0.5 | 0.5 | 0.5 | 0.5 | 0.5 | 0.5 | 0.5 |
| SDBS | | 1 | 2 | | | | |
| KSS | | | | 1 | 2 | 1 | 1 |
| ESD Decay Time | | | | | | | |
| (24 hr.) 10% | 0.21 | 0.14 | 0.14 | 0.04 | 0.04 | 0.01 | 0.15 |
| (@ 15% rh) 0% | 3.5 | 1.28 | 1.14 | 0.444 | 0.47 | 0.1 | 0.99 |
| Izod Impact | 3.8 | 3.3 | 2.3 | 3.6 | 3.4 | 3.3 | 2.9 |

EXAMPLES 15-24

In these examples, additional compositions according to the present invention were prepared wherein the surfactant employed was a cationic/anionic surfactant or a nonionic surfactant. Specifically, the cationic/anionic surfactants which were employed in these examples were selected from the following: Larostat 904 (imidazoline-type paratoluene sulfonate), Larostat 905 (octyldimethyl ethoxyammonium methane sulfonate) and Larostat 906 (octyldimethyl ethoxy ammonium dodecylbenzene sulfonate). The nonionic surfactants employed in these examples were selected from Armostat 410 (bis(hydroxyethyl)coco amine) and Exxon E17-2 (dihydroxy ethyl isodecyl oxypropylamine). The compositions of these examples also included an ABS graft copolymer, a SAN copolymer, an ECHEO antistatic agent and a PMMA polymer as described in Examples 1-7. The compositions of Examples 15-24 were blended in the manner described with respect to Examples 1-7 and then were compression molded into test bars. The test bars were subjected to measurement of the ESD and Izod impact strength properties. The recipes of the compositions of Examples 15-24 and the results of the aforementioned measurements are set forth in Table 3.

TABLE 3

| Ex. No. | 15 | 16 | 17 | 18 | 19 | 20 | 21 | 22 | 23 | 24 |
|---|---|---|---|---|---|---|---|---|---|---|
| ABS | 24 | 24 | 24 | 24 | 24 | 24 | 24 | 24 | 24 | 24 |

TABLE 3-continued

| Ex. No. | 15 | 16 | 17 | 18 | 19 | 20 | 21 | 22 | 23 | 24 |
|---|---|---|---|---|---|---|---|---|---|---|
| SAN | 60 | 60 | 60 | 60 | 60 | 60 | 60 | 60 | 60 | 60 |
| ECHEO | 12 | 12 | 12 | 12 | 12 | 12 | 12 | 12 | 12 | 12 |
| PMMA | 4.5 | 4.5 | 4.5 | 4.5 | 4.5 | 4.5 | 4.5 | 4.5 | 4.5 | 4.5 |
| MgSt | 0.5 | 0.5 | 0.5 | 0.5 | 0.5 | 0.5 | 0.5 | 0.5 | 0.5 | 0.5 |
| EBS Wax | 1 | 1 | 1 | 1 | 1 | 1 | 1 | 1 | 1 | 1 |
| Armostat 410 | 1 | 2 | | | | | | | | |
| Exxon E17-2 | | | 1 | 2 | | | | | | |
| HTS 904 Larostat | | | | | 1 | 2 | | | | |
| HTS 905 Larostat | | | | | | | 1 | 2 | | |
| HTS 906 Larostat | | | | | | | | | 1 | 2 |
| ESD decay time, seconds | | | | | | | | | | |
| 1 day 10% | 0.77 | 0.57 | 0.97 | 0.53 | 0.22 | 0.16 | 0.14 | 0.1 | 0.21 | 0.15 |
| @ 15% rh 0% | 5.3 | 3.3 | >30 | 3.3 | 2 | 1.35 | 1.58 | 1.16 | 2.09 | 1.44 |
| 1 week 10% | 0.52 | 0.41 | 0.99 | 0.45 | 0.24 | 0.17 | 0.14 | 0.09 | 0.2 | 0.14 |
| @ 15% rh 0% | 2.5 | 2.08 | >30 | 2.3 | 2.02 | 1.42 | 1.26 | 0.91 | 1.68 | 1.24 |
| 24 hours after cleaning 0% | >30 | 3.7 | >30 | 4.4 | 2.20 | 1.57 | 1.48 | 1.19 | 2.35 | 1.61 |
| Izod ft#/in | 3 | 3 | 3.1 | 3 | 2.8 | 2 | 3 | 3 | 3.2 | 2.9 |

While this invention has been described in connection with certain specific embodiments, it will be obvious to those skilled in the art that other combinations may be used. Accordingly the scope of the invention should be determined solely by the appended claims.

What is claimed is:

1. A polymer blend composition, comprising (a) a graft copolymer comprising a conjugated diene substrate to which at least two monomers are grafted, the at least two monomers being selected from the group consisting of monovinylaromatic monomers, acrylonitrile and acrylic acid esters, (b) from about 5 to about 20 weight percent of a copolymer of an epihalohydrin and an alkylene oxide, and (c) from about 0.1 to about 5 weight percent of a surfactant having a hydrophilic portion and a hydrophobic portion and selected from the group consisting of anionic surfactants, nonionic surfactants and quaternary ammonium compounds provided with an anionic surfactant substituent.

2. A polymer blend composition as defined by claim 1, wherein the epihalohydrin copolymer is formed from epichlorohydrin and ethylene oxide.

3. A polymer blend composition as defined by claim 1, wherein the surfactant comprises an anionic surfactant.

4. A polymer blend composition as defined by claim 3, wherein the anionic surfactant is selected from the group consisting of alkylaryl sulfonates, aryl sulfonates and derivatives thereof.

5. A polymer blend composition as defined by claim 1, wherein the surfactant comprises a quaternary ammonium compound provided with an anionic surfactant substituent.

6. A polymer blend composition as defined by claim 1, wherein the surfactant comprises a nonionic surfactant.

7. A polymer blend composition as defined by claim 1, wherein the graft copolymer comprises a mixture of the conjugated diene substrate to which the grafting monomers are polymerized and a copolymer of the grafting monomers.

8. A polymer blend composition as defined by claim 1, further comprising polymethylmethacrylate.

9. A polymer blend composition as defined by claim 8, wherein the polymethylmethacrylate is included in an amount sufficient to act as a compatibilizing agent for the polymers.

10. A polymer blend composition, comprising
(a) from about 5 to about 25 weight percent of a copolymer of an epihalohydrin and an alkylene oxide, (b) from about 0.1 to about 4 weight percent of a surfactant having a hydrophilic portion and a hydrophobic portion and selected from the group consisting of anionic surfactants, nonionic surfactants and quaternary ammonium compounds provided with an anionic surfactant substituent, (c) a polymethylmethacrylate in an amount sufficient to act as a compatabilizing agent for the polymer components of the blend, and (d) a balance of a graft copolymer comprising a conjugated diene substrate to which at least two monomers are grafted, the at least two monomers being selected from the group consisting of monovinylaromatic monomers, acrylonitrile and acrylic acid esters.

* * * * *